US009152392B2

(12) United States Patent
Petro et al.

(10) Patent No.: US 9,152,392 B2
(45) Date of Patent: Oct. 6, 2015

(54) SYSTEMS AND METHODS FOR REALTIME CREATION AND MODIFICATION OF A DYNAMIC MEDIA PLAYER AND DISABLED USER COMPLIANT VIDEO PLAYER

(71) Applicant: Piksel, Inc., Wilmington, DE (US)

(72) Inventors: Michael Anthony Petro, Rockaway, NJ (US); Keith David Schnable, Redmond, WA (US); David Persing, Issaquah, WA (US); Maxim Gubin, Forest Hills, NY (US); Leonid Geller, Secaucus, NJ (US); Joseph Jacques-André Chamberland, Toronto (CA); David Martin Anderson, Lynnwood, WA (US)

(73) Assignee: Piksel, Inc., Wilmington, DE (US)

( * ) Notice: Subject to any disclaimer, the term of this patent is extended or adjusted under 35 U.S.C. 154(b) by 0 days.

(21) Appl. No.: 14/052,670

(22) Filed: Oct. 11, 2013

(65) Prior Publication Data

US 2014/0245277 A1 Aug. 28, 2014

Related U.S. Application Data

(63) Continuation of application No. 12/469,650, filed on May 20, 2009, now abandoned.

(60) Provisional application No. 61/054,794, filed on May 20, 2008, provisional application No. 61/055,058, filed on May 21, 2008, provisional application No. 61/090,192, filed on Aug. 19, 2008.

(51) Int. Cl.
*G06F 9/44* (2006.01)
*G09B 21/00* (2006.01)
(Continued)

(52) U.S. Cl.
CPC .............. *G06F 8/34* (2013.01); *G06F 3/0482* (2013.01); *G06F 3/04842* (2013.01); *G06F 8/20* (2013.01);
(Continued)

(58) Field of Classification Search
CPC .............. G06F 8/20; G06F 8/31; G06F 8/34; G06F 8/41; G06F 3/1246; G09B 21/005
USPC .......... 717/100–178; 715/210, 239, 707, 714, 715/716, 729, 747, 865
See application file for complete search history.

(56) References Cited

U.S. PATENT DOCUMENTS 5,929,857 A * 7/1999 Dinallo et al. ................ 715/840
7,082,577 B1 * 7/2006 Brosnahan .................... 715/860
(Continued)

OTHER PUBLICATIONS

A Paradigm of a Pervasive Multimodal Multimedia Computing System for the Visually-Impaired Users; Ali Awde, Manolo Dulva Hina, Chakib Tadj, Amar Ramdane-Cherif, and Yacine Bellik—Natural Sciences and Engineering Research Council (NSERC) of Canada—Y.-C. Chung and J.E. Moreira (Eds.): GPC 2006, LNCS 3947, pp. 620-633, 2006.*

(Continued)

*Primary Examiner* — Lewis A Bullock, Jr.
*Assistant Examiner* — Francisco Aponte
(74) *Attorney, Agent, or Firm* — Hamilton, Brook, Smith & Reynolds, P.C.

(57) ABSTRACT

Methods and systems for a disabled user compliant video player for an end-to-end streaming web video solution affording accessibility for disabled users, including blind users and those with partial or poor vision, colorblind users, deaf users and those limited to only keyboard/voice input. Another embodiment of the present invention is directed to systems and methods for real-time creation and modification of specialized media players, to be used as stand-alone applications or as embedded data display applications.

31 Claims, 18 Drawing Sheets

(51) Int. Cl.
*H04N 21/488* (2011.01)
*H04N 21/81* (2011.01)
*H04N 21/8543* (2011.01)
*G06F 9/445* (2006.01)
*G06F 9/45* (2006.01)
*G06F 3/0482* (2013.01)
*G06F 3/0484* (2013.01)
*H04L 29/06* (2006.01)

(52) U.S. Cl.
CPC .. *G06F 8/38* (2013.01); *G06F 8/41* (2013.01); *G06F 8/60* (2013.01); *G06F 8/65* (2013.01); *G09B 21/005* (2013.01); *H04N 21/4884* (2013.01); *H04N 21/8193* (2013.01); *H04N 21/8543* (2013.01); *H04L 65/4084* (2013.01)

(56) References Cited

U.S. PATENT DOCUMENTS

| | | | |
|---|---|---|---|
| 7,426,691 B2 * | 9/2008 | Novak et al. | 715/744 |
| 7,554,522 B2 * | 6/2009 | Sinclair et al. | 345/156 |
| 7,743,009 B2 * | 6/2010 | Hangartner et al. | 706/46 |
| 7,818,664 B2 * | 10/2010 | Gordon et al. | 715/234 |
| 7,831,432 B2 * | 11/2010 | Bodin et al. | 704/275 |
| 7,987,148 B2 * | 7/2011 | Hangartner et al. | 706/46 |
| 8,429,516 B1 * | 4/2013 | Riggs et al. | 715/201 |
| 2002/0085020 A1 * | 7/2002 | Carroll, Jr. | 345/700 |
| 2003/0018663 A1 * | 1/2003 | Cornette et al. | 707/500.1 |
| 2005/0015254 A1 * | 1/2005 | Beaman | 704/270.1 |
| 2005/0102626 A1 | 5/2005 | Novak et al. | |
| 2007/0276865 A1 * | 11/2007 | Bodin et al. | 707/104.1 |
| 2008/0059504 A1 * | 3/2008 | Barbetta et al. | 707/102 |
| 2008/0077852 A1 | 3/2008 | Fleishman et al. | |
| 2008/0147217 A1 * | 6/2008 | Chung et al. | 700/94 |
| 2008/0303827 A1 * | 12/2008 | Schiff | 345/473 |
| 2009/0024922 A1 * | 1/2009 | Markowitz et al. | 715/716 |
| 2009/0024923 A1 * | 1/2009 | Hartwig et al. | 715/716 |
| 2009/0055742 A1 * | 2/2009 | Nordhagen | 715/716 |
| 2010/0077322 A1 | 3/2010 | Petro et al. | |
| 2010/0154035 A1 * | 6/2010 | Damola et al. | 726/4 |
| 2011/0161348 A1 * | 6/2011 | Oron | 707/769 |
| 2011/0202842 A1 * | 8/2011 | Weatherly et al. | 715/716 |
| 2012/0137254 A1 * | 5/2012 | Cunningham et al. | 715/835 |
| 2015/0100944 A1 | 4/2015 | Petro et al. | |
| 2015/0106719 A1 | 4/2015 | Petro et al. | |

OTHER PUBLICATIONS

Non-Final Office Action for U.S. Appl. No. 12/469,650, Date Mailed: Apr. 28, 2011.

* cited by examiner

SYSTEMS AND METHODS FOR REALTIME CREATION AND MODIFICATION OF A DYNAMIC MEDIA PLAYER AND DISABLED USER COMPLIANT VIDEO PLAYER

RELATED APPLICATIONS

This application is a continuation of U.S. patent application Ser. No. 12/469,650 filed on May 20, 2009, which claim priority to U.S. Provisional Patent Application Ser. No. 61/054,794 filed May 20, 2008, U.S. Provisional Patent Application Ser. No. 61/055,058 filed May 21, 2008 and U.S. Provisional Patent Application Ser. No. 61/090,192 filed Aug. 19, 2008. All of the foregoing applications are hereby incorporated by reference in their entirety as if fully set forth herein.

GOVERNMENT SUPPORT

Portions of one or more embodiments of the invention(s) described herein were made with Government support under contract GSV06PD00165 awarded by the General Services Administration. The Government has certain rights in certain embodiments of some of these invention(s).

COPYRIGHT NOTICE

This disclosure is protected under United States and International Copyright Laws. ©2008-2009 The FeedRoom, Inc., All Rights Reserved. A portion of the disclosure of this patent document contains material which is subject to copyright protection. The copyright owner has no objection to the facsimile reproduction by anyone of the patent document or the patent disclosure after formal publication by the USPTO, as it appears in the Patent and Trademark Office patent file or records, but otherwise reserves all copyright rights whatsoever.

BACKGROUND OF THE INVENTION

A media player typically describes computer software used for playing back various audio and video multimedia files on both stand-alone computing devices and on computing devices connected to a network, such as the Internet. Designers of these media players attempt to tailor the user interface and functionality of their software applications according to various design preferences specified by their customers, who are either the hosts or users of these customized media players.

Today, many media players are designed to be embedded in various data displays, such as web pages, electronic programming guides, and other mobile software applications creating graphical compositions. The data display platforms associated with these embedded media players can include specialized scripting which calls for a media player application resident on a host or client side, for dynamically embedding the player in a particular data display. Adobe AIR™ platforms such as Flash™ (previously Shockwave Flash, SWF) and Flash Lite™ are examples of commonly used platforms for embedding multimedia content such as streaming video and audio into web pages. These Adobe platforms utilize the ActionScript™ scripting language to create embedded content that is capable of playing SWF (.swf) and Flash Video (.flv) data formats. Other platforms that facilitate embedding media applications in various web based data displays include: Adobe Flex™, Microsoft Silverlight™, and Sun Microsystems JavaFX™, and open source GNU/Linux platforms such as Moonlight™.

Whether a media player is designed as a stand-alone software application to be independently executed on a local computing device or whether a media player is designed to be dynamically embedded in a web-based data display, the goal of the software designer remains the same: to custom tailor a media player to best meet a given customer's needs and preferences. Unfortunately, at present, a media player customer who desires specialized characteristics and functionality in their media player (either at the time of creation or as a subsequent modification), has to submit these custom specifications to a software designer for reprogramming, recompiling, and redistribution of a static media player application. This redesign process is inefficient, time intensive, and unnecessarily expensive for most media player customers and applications.

To remedy the above inefficiencies, it would be advantageous to facilitate easy real-time creation and modification of custom designed media players.

DETAILED DESCRIPTION OF THE INVENTION

Figure 1:
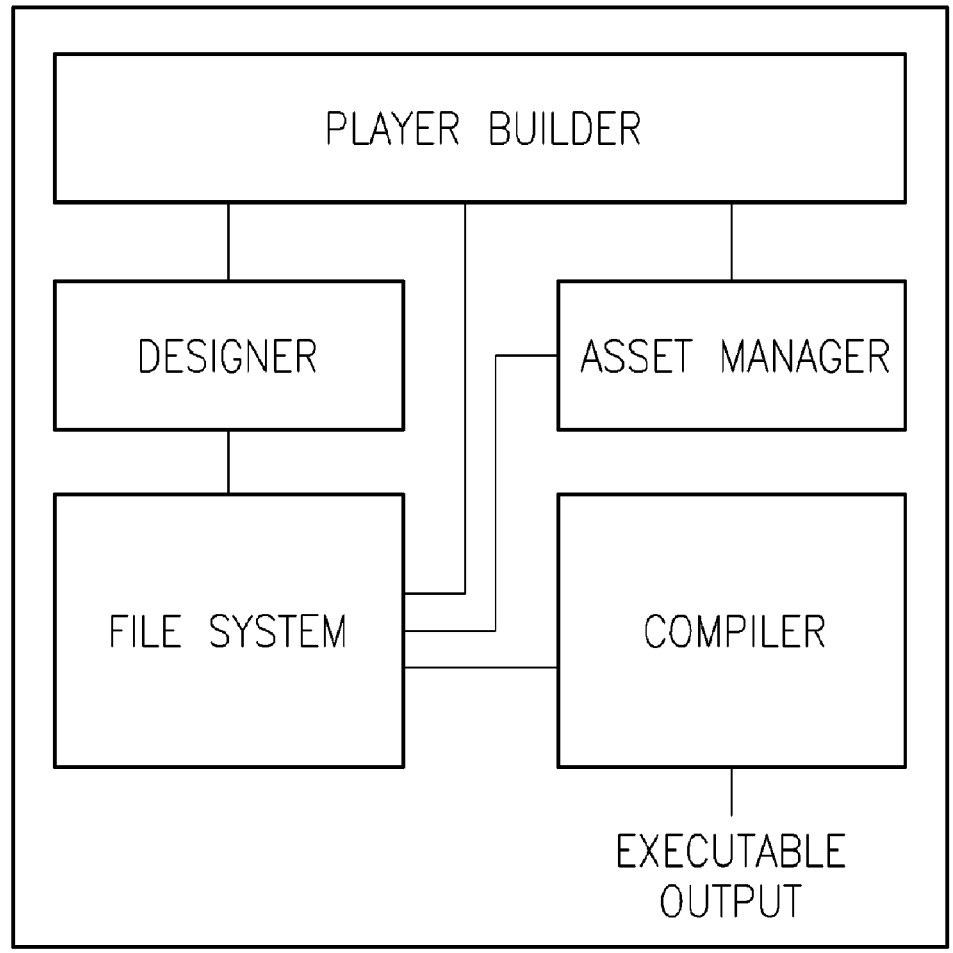
FIG. 1 is flowchart illustrating how the Designer, Asset Manager, and Compiler applications are in communication with the File System.

Embodiments of the present invention are directed to systems and methods for real-time creation and modification of specialized media players, to be used as stand alone applications or as embedded data display applications. In various embodiments of the present invention these applications can include both host and client side applications. Example programming platforms that can be used to realize software applications associated with the systems and methods of the present invention, include, but are not limited to, various Sun Microsystems JAVA™ platforms and various Adobe AIR™ platforms. In an embodiment of the present invention, a system facilitating these objectives may include one or more of at least the following components: a Player Builder, a Designer, an Asset Manager, a File System, and a Compiler. In accordance with an embodiment of the present invention, the Player Builder application is in communication with the Designer application, the Asset Manager application, the Compiler application, and the File System. Further, each of the Designer, Asset Manager, and Compiler applications are in communication with the File System (See FIG. 1). The functionality and significance of these components and their communications are discussed further, herein.

The Player Builder application provides an interface for a user to access and create various media player files using a personal computing device, such as desktop computer, a laptop computer, or any other portable computing device. In certain embodiments of the present invention this computing device could be an isolated computing device running the Player Builder application from a local directory. In other embodiments, the computing device could be a networked device, running the Player Builder application from a networked directory location.

The Designer application preferably interfaces with the Player Builder application to permit a user to actively modify a selected player file utilizing a variety of design interface tools that are available to a user in a design mode. The Asset Manager can be an application which interfaces with the Player Builder and the Designer applications to allow a user to associate certain preconfigured assets or media to a select player during a design mode. The File System facilitates logical storage and retrieval of all data associated with the systems of the present invention, such as media files, parameter assets, asset components, player files, etc. The Compiler can be an application that imports and/or accesses a user created player data file (e.g., an XML script, various assets, and other associated data that may be generated by or referenced with the Player Builder and/or Designer applications, and then compiles all of this combined data into one executable custom media player application.

Figure 2:
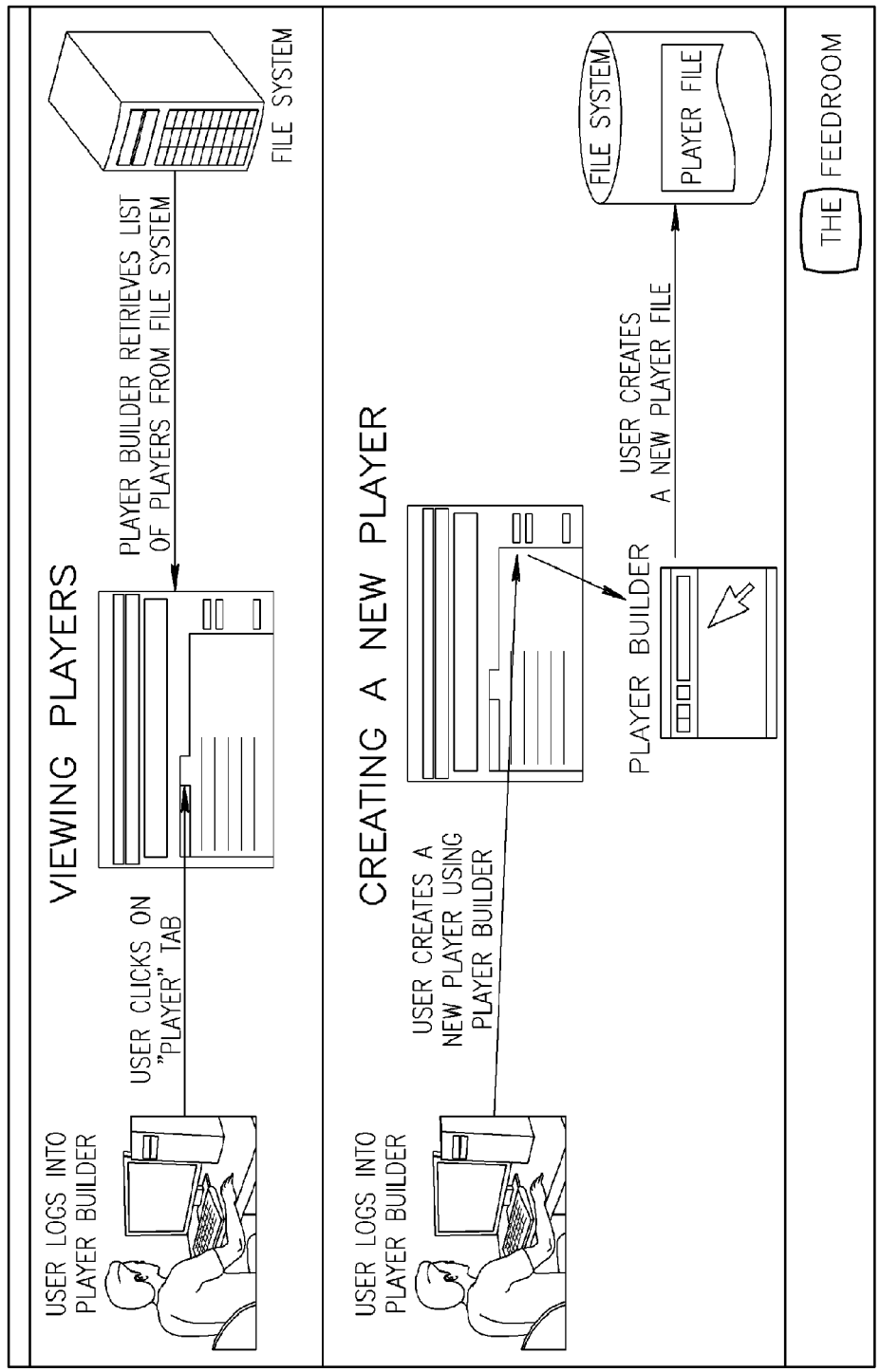
FIG. 2 illustrates a user with access to the Player Builder application logging into the Player Builder by using a user name and/or password associated with an approved customer account and the Player Builder retrieving a list of players from a File System.

In accordance with an embodiment of the present invention, a user with access to the Player Builder application may log into the Player Builder by using a user name and/or password associated with an approved customer account (See FIG. 2). Once in the Player Builder application, a user is capable of selecting a "players" feature for viewing a listing of existing custom media players associated with player templates stored in the File System (See FIG. 3). The media player listing displayed to a user further provides a user with the ability to redesign, remove, preview, and export a listed player. A template player listing (See FIG. 4) provides a user with the ability to select and create a specialized template media player with preconfigured assets and/or attributes that meet a user's design preferences. These template media players provide a relatively quick and easy way for a user to create a customized media player. In an embodiment of the present invention, selection of a template player invokes the Designer application so that a preconfigured template player can be dynamically modified with various design tools in a design mode.

A logged in user can also utilize the Player Builder application to create a new media player by selecting the "create new player" feature in the Player Builder interface. Selection of the "create new player" feature invokes the Designer application which can be run synchronously with the Player Builder application. In accordance with an embodiment of the present invention a user can create a new player without using templates or previously designed media players as a starting point. These new players can be constructed from scratch, utilizing design tools and preconfigured player component blocks available to a user in a design mode. These component block assets can be associated with a new player under design utilizing the Asset Manager application. In an embodiment of the present invention, the Asset Manger links a player identification to selected block component identifications in the File System, for later retrieval by the Compiler application.

Figure 4:
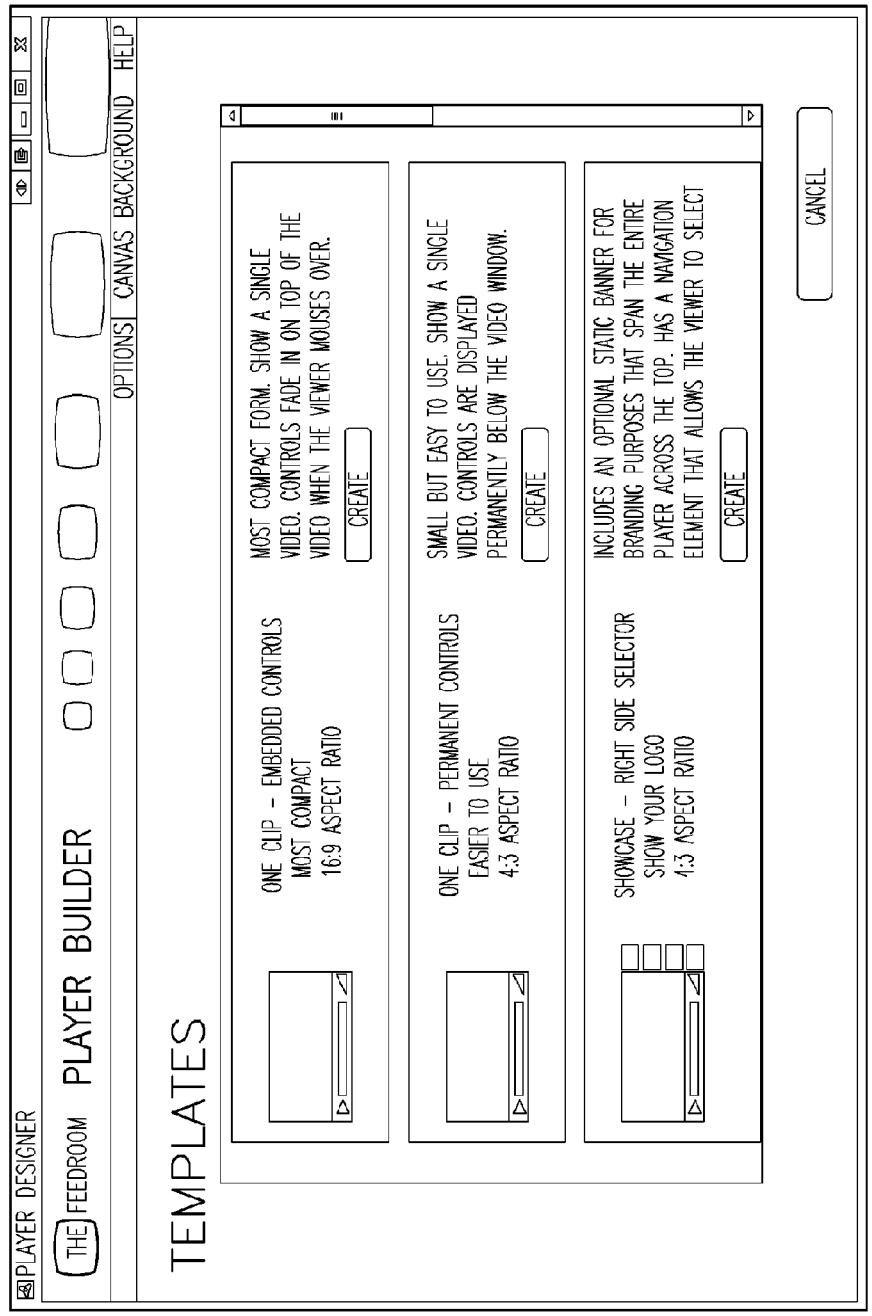
FIG. 4 illustrates one embodiment of the Player Listing template.
Figure 5:
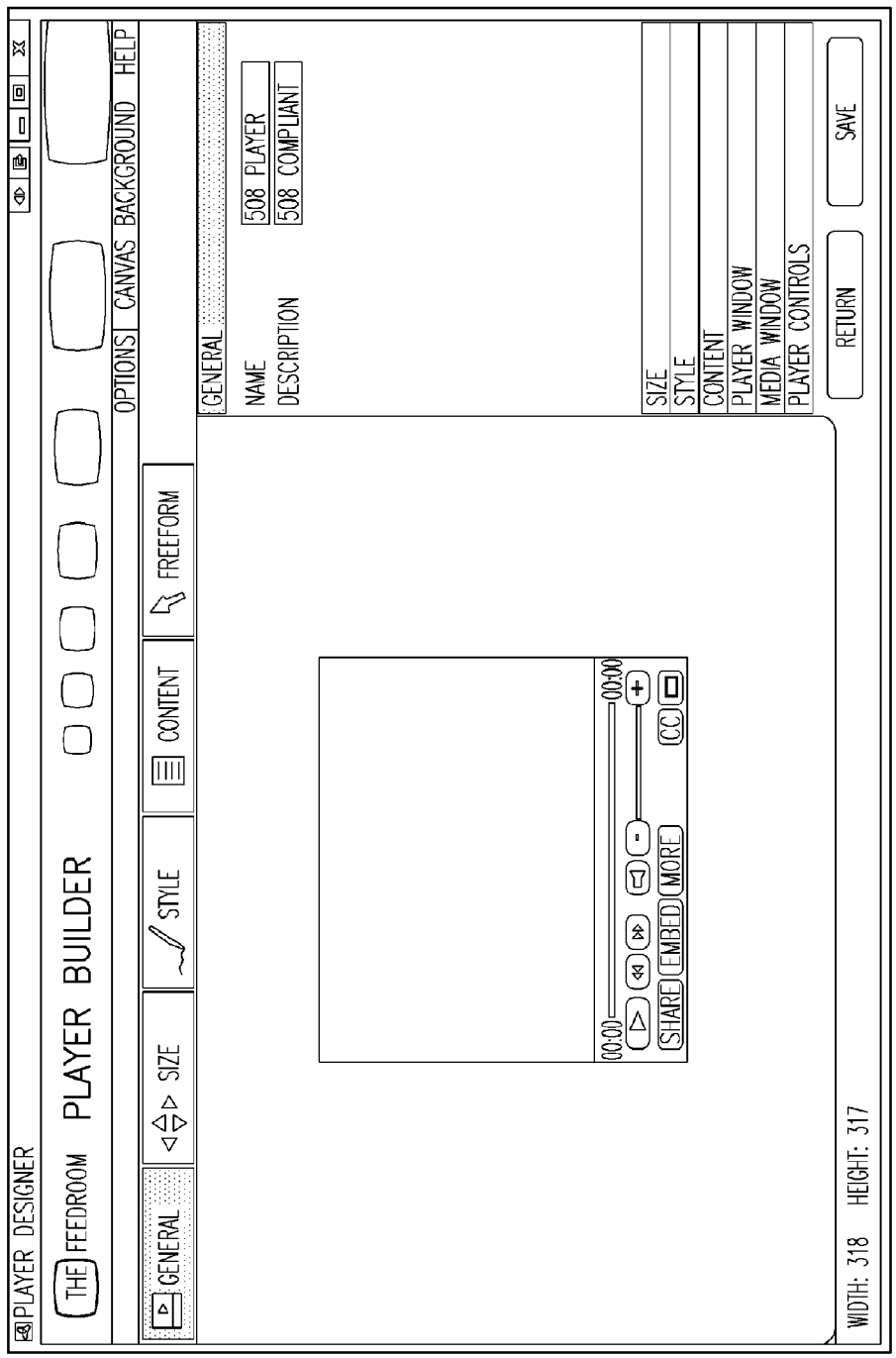
FIG. 5 illustrates one embodiment of the general design interface.

Various design interfaces associated with the Designer application include, but are not limited to, the following interfaces: General, Size, Style, Content, and Freeform (See FIGS, 5-9). The General design interface (See FIG. 5) includes a graphical depiction of a media player under design (e.g., a player based on a previously designed media player in the player listing (See FIG. 3), or based on a selected player template (See FIG. 4)) and multiple user input areas where a user is capable of entering a player name and a brief description of a player type. In an embodiment of the present invention, the player description is intended to designate a compatibility standard.

Figure 6:
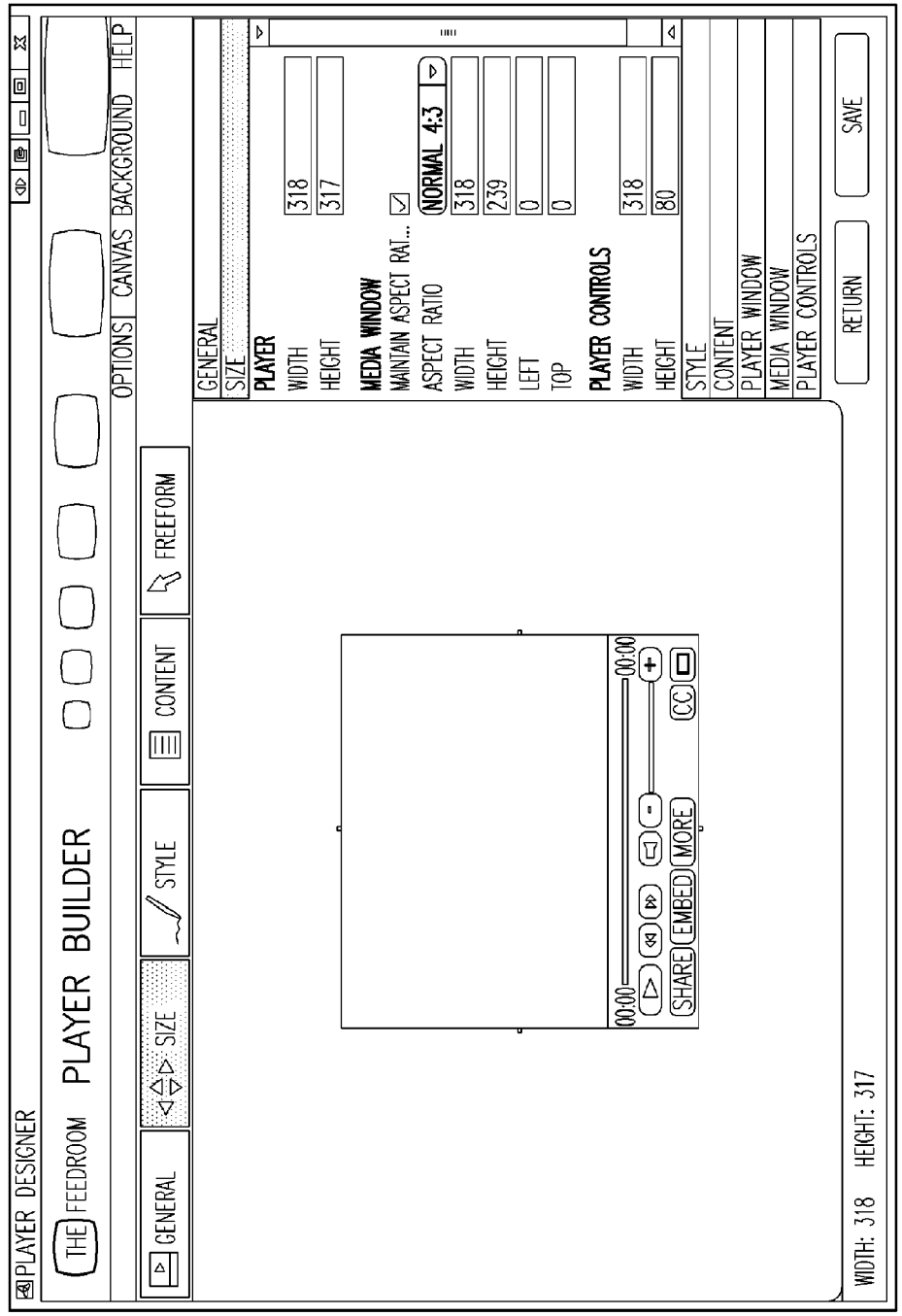
FIG. 6 illustrates one embodiment of the Size Design interface.

The Size design interface (See FIG. 6) allows a user to independently size various component block assets associated with a particular player. Component blocks can comprise various preconfigured script assets (e.g., interactive command buttons, slide bars, dials, checkboxes, etc.) and various static parameter assets (e.g., color schemes, aspect ratios, video and sound specifications, etc.). An example embodiment of the Size design interface includes multiple sizing handles associated with individual component blocks, including: a player window block, a media window block, and a player controls block. In accordance with this embodiment, a user can select (e.g., by use of a single-click) and drag the handles associated with a select component block to a desired size and position in a design window, to resize the select component block. The component block assets (e.g., buttons, slide bars, etc.) dynamically resize to correspond to the size and position associated with the resized component block. Alternatively, a user can manually enter height, width, and positional values directly into a user input sizing window of the Size design interface, thereby dynamically resizing a component block and its asset components.

Figure 7:
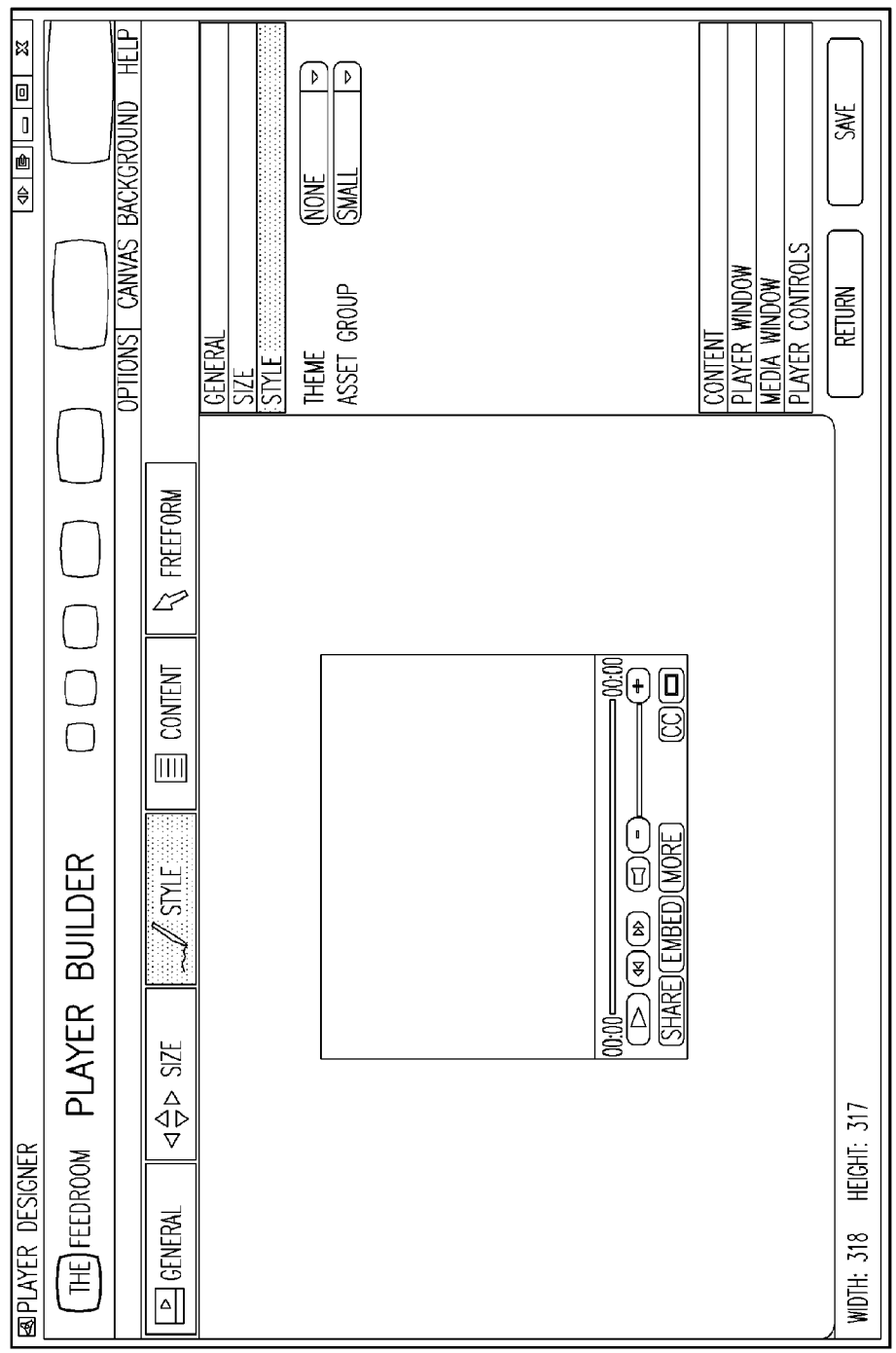
FIG. 7 illustrates one embodiment of the Style Design interface.
Figure 8:
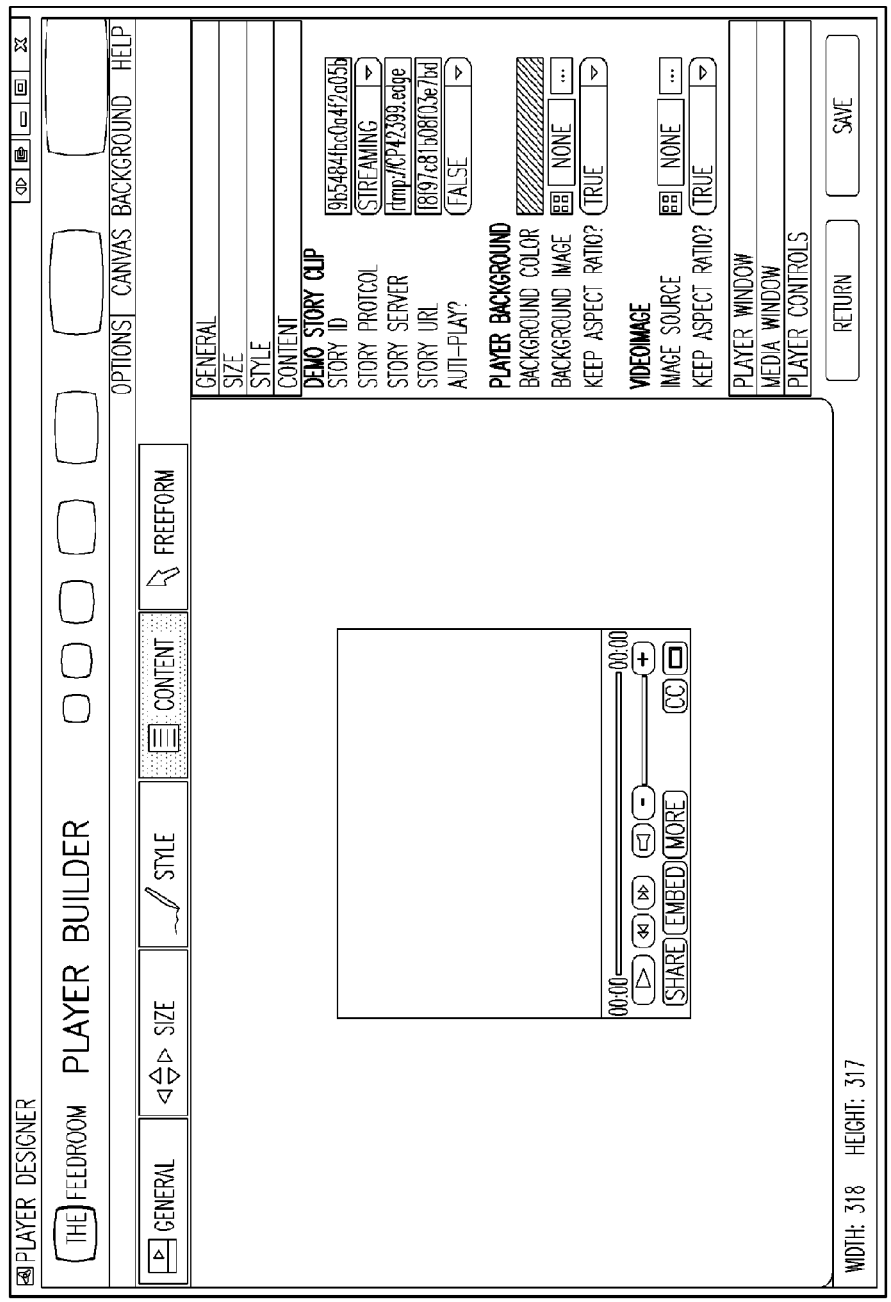
FIG. 8 illustrates one embodiment of the Content Design interface.

The Style design interface (See FIG. 7) allows a user to apply various themes to a media player under design and to various asset groups associated with component blocks of that media player. In some embodiments the themes apply to purely aesthetic characteristics and in other embodiments the themes can alter functionality associated with player component block assets. The Content design interface (See FIG. 8) allows a user to associate select multimedia files (e.g., video and audio files) in a File System with a particular media player. In an embodiment, the Content design interface includes various user input areas associated with a media ID, a media protocol, a host media server, a URL associated with a media location, and an auto play preference. Other input areas of the Content design interface can include various background and video characteristics that a user can associate with a media player.

Figure 9:
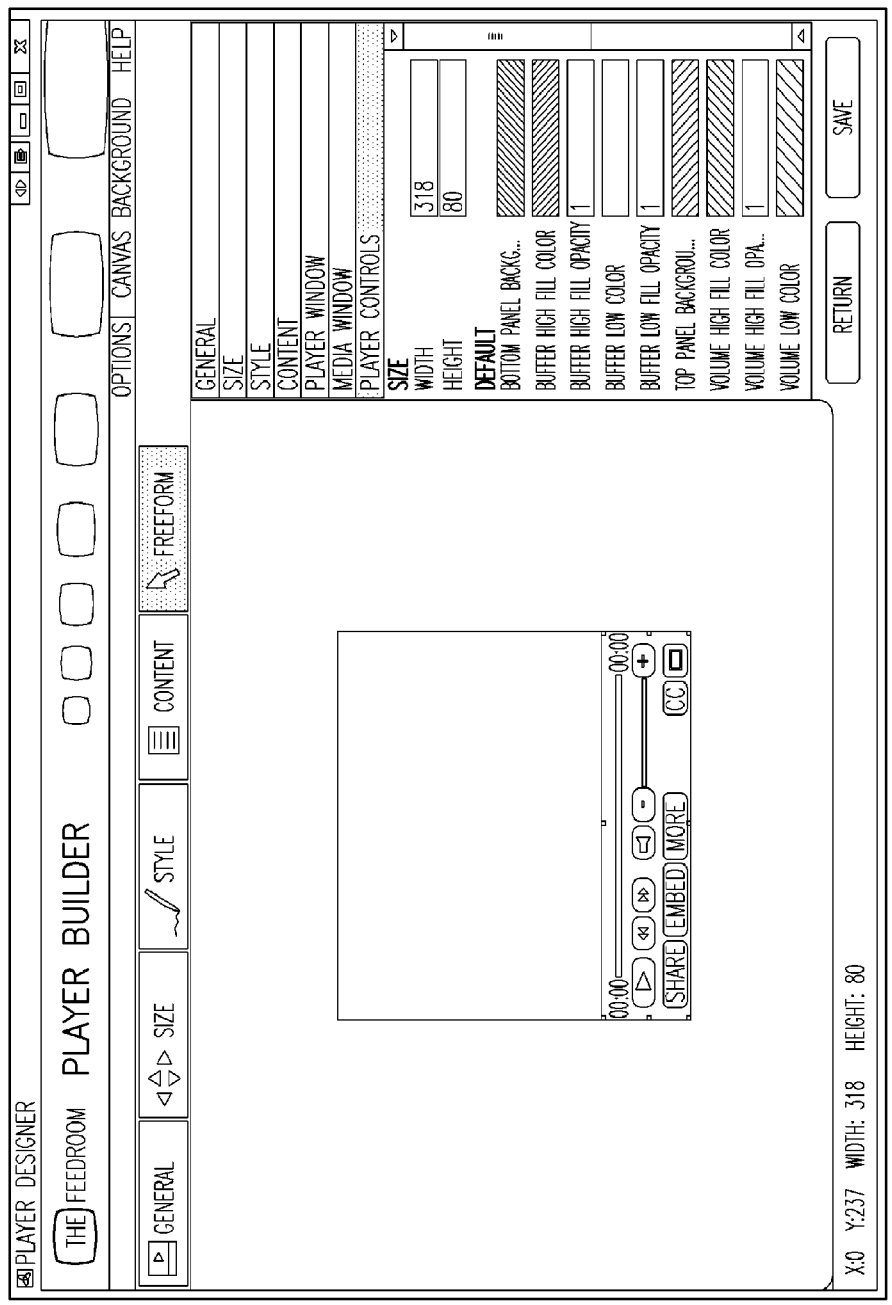
FIG. 9 illustrates one embodiment of the FreeForm Design interface.

With the Freeform design interface (See FIG. 9), a user can select various parameters associated with a player window block, the media window block, and the player controls block of a media player. In an embodiment of the present invention, these parameters include component sizing parameters, background colors parameters, component fill color parameters, and component opacity parameters. The Asset Manager associates these asset parameters with block components stored in the File System. After selecting various media player design preferences in each of the General, Size, Style, Content, and Freeform design interfaces, a user can save their associated media player design selections to the File System by selecting a save feature.

Figure 10:
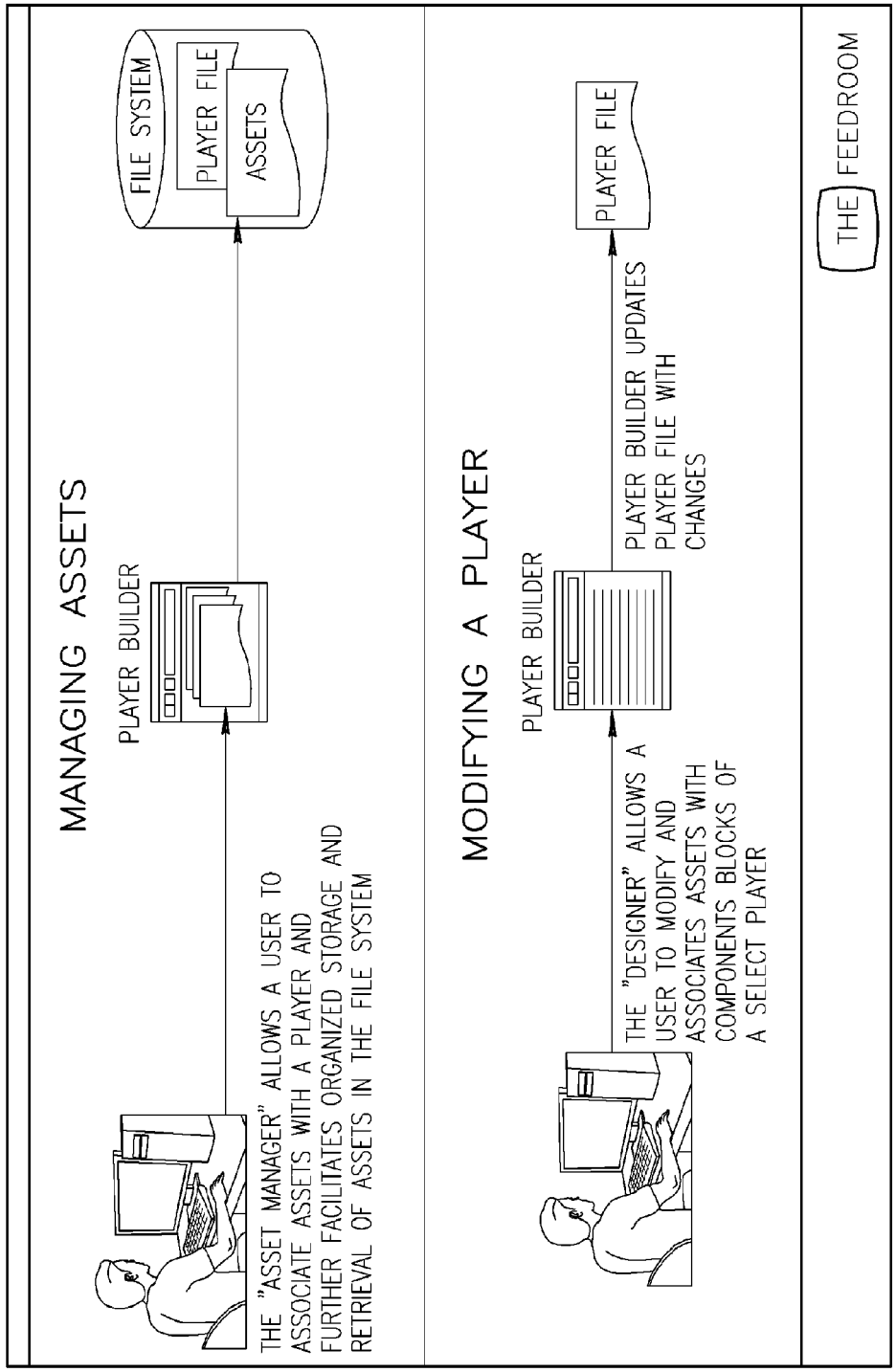
FIG. 10 illustrates one embodiment of the Player Builder Applications interacting with the Asset Manager and the Designer.

The Asset Manager application runs synchronously with the Player Builder and Designer applications (See FIG. 10). In some embodiments of the present invention, the Asset Manager creates a logical directory of data associated with a player file in the File System. This data can include static player parameter assets (e.g., color schemes, aspect ratios, video and sound specifications, etc.) and active player component assets (e.g., interactive command buttons, slide bars, dials, checkboxes, etc.). In an embodiment, a logical directory of player asset identifications is linked to a corresponding player identification in the File System. This asset to player linking facilitates dynamic retrieval of all data related to a player file at the time the Compiler compiles a specific user created player file.

Figure 3:
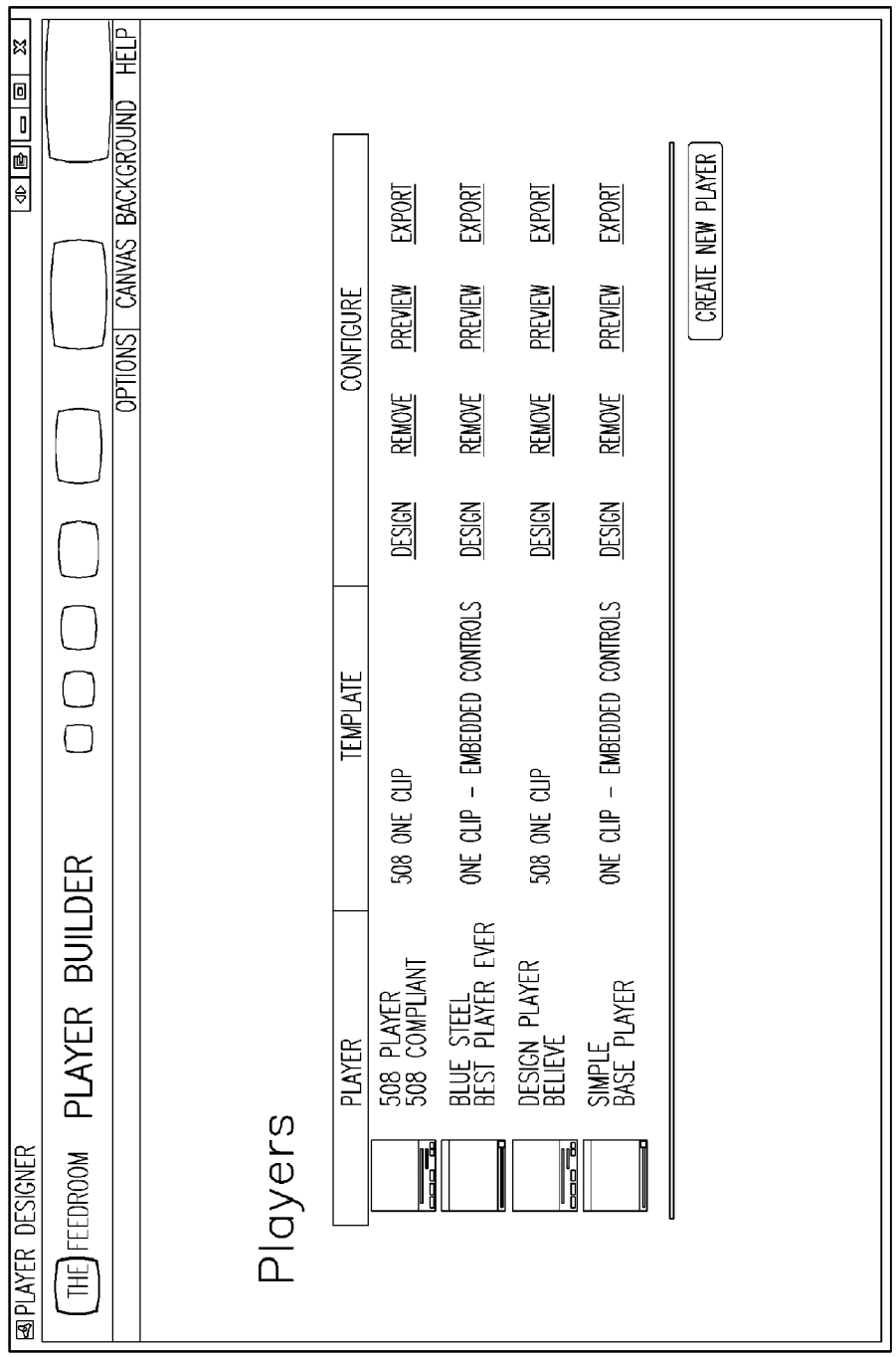
FIG. 3 is a screenshot of the Player Builder application illustrating where a user is capable of selecting a "players" feature for viewing a listing of existing custom media players associated with player templates stored in the File System.
Figure 11:
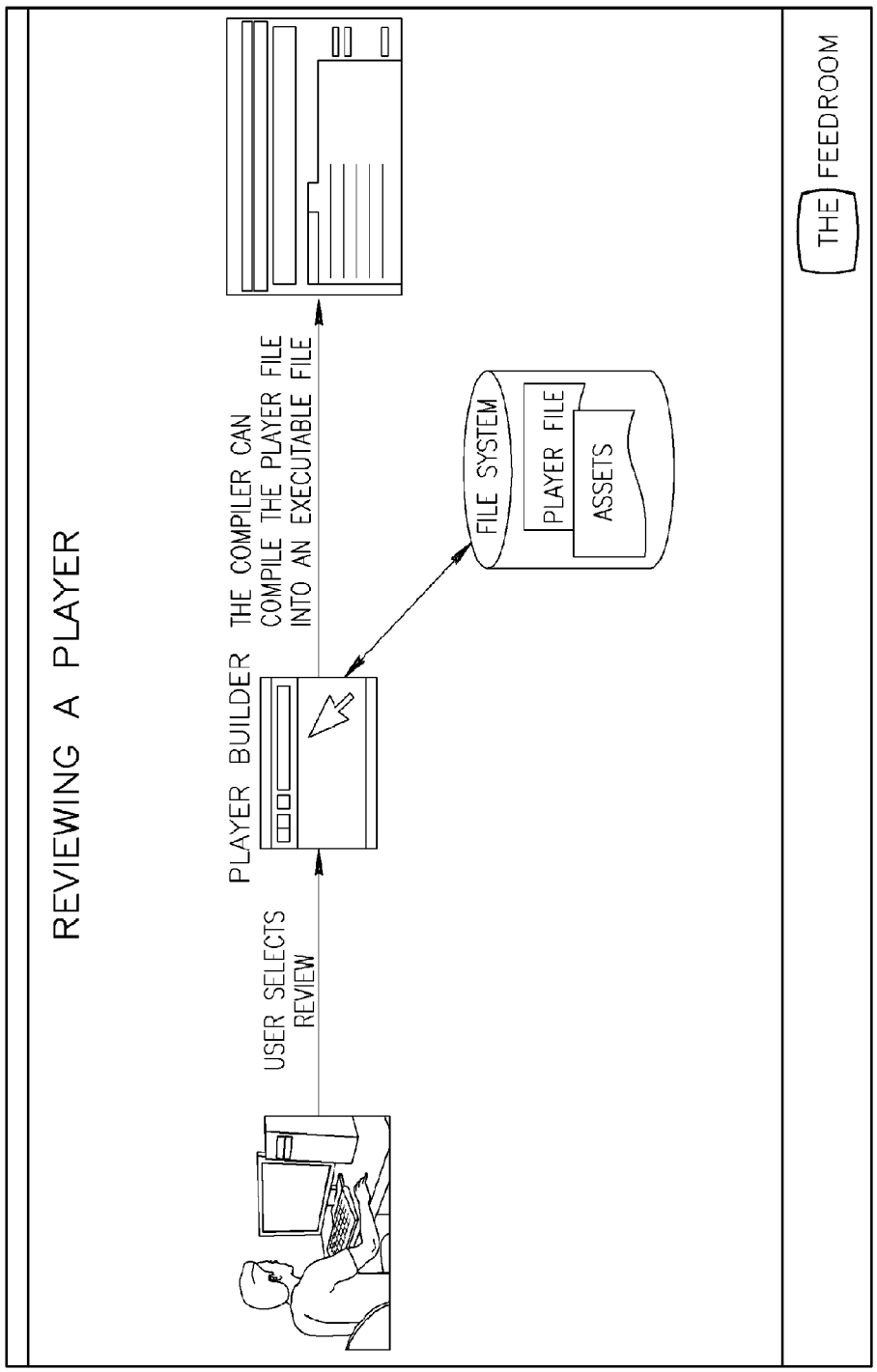
FIG. 11 illustrates one embodiment of the Player Builder in preview function.

The Player Builder application's player listing interface allows a user to view a listing of existing media players in the File System (See FIG. 3). The media player listing further provides a user with the ability to modify, preview, remove, and export a listed player. In an embodiment, when a user selects the modify option, the Player Builder invokes the Designer application interface wherein a user can modify and associate various assets with the component blocks of a select player (See FIG. 10). In a further embodiment, when a user selects the preview option, the Player Builder invokes the Compiler to compile a player file and associated assets to create a preview related to the executable media player (See FIG. 11). In some embodiments the compiled preview player is displayed to a user as a scaled up image representation of what the player's user interface looks like and in other embodiments the compiled preview is a full executable version of the listed media player. When a user selects the remove feature, a selected media player is removed from the listing and in some embodiments the File System as well. In an embodiment, when a user selects the export feature, a user is prompted to designate a local or remote directory location where to export an executable version of the listed media player.

Figure 12:
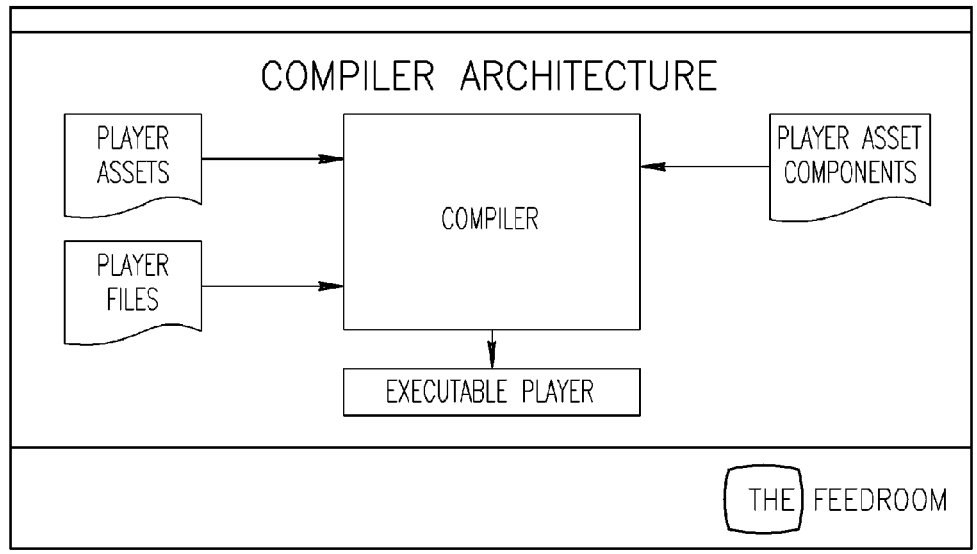
FIG. 12 is a diagram illustrating one embodiment of the Compiler Architecture.
Figure 13:
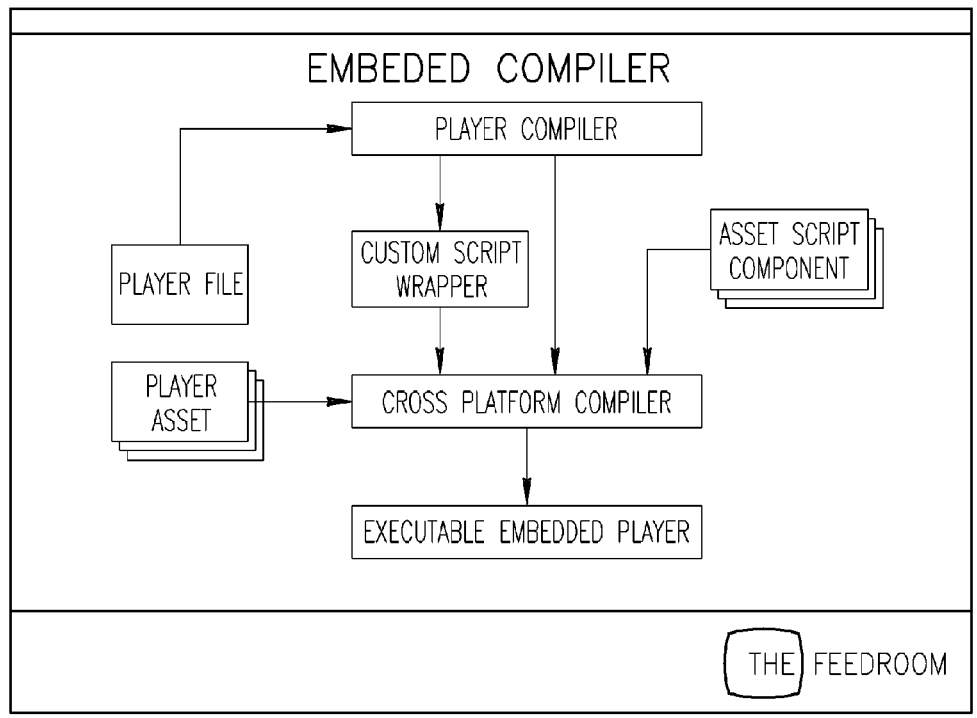
FIG. 13 is a diagram illustrating one embodiment of the Embedded Player Compiler.
Figure 15:
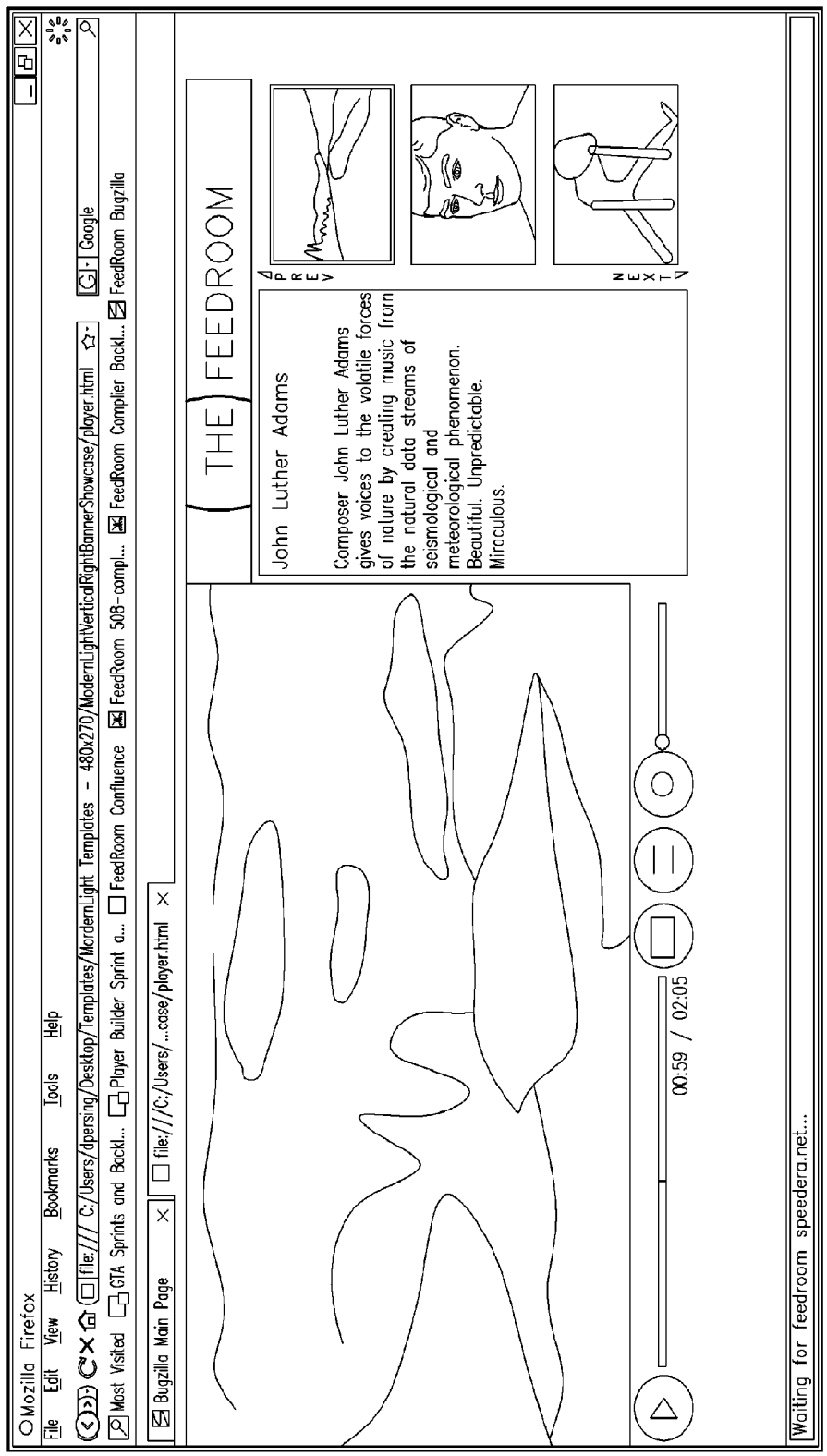
FIG. 15 is a screenshot illustrating a web based embedded player application.
Figure 16:
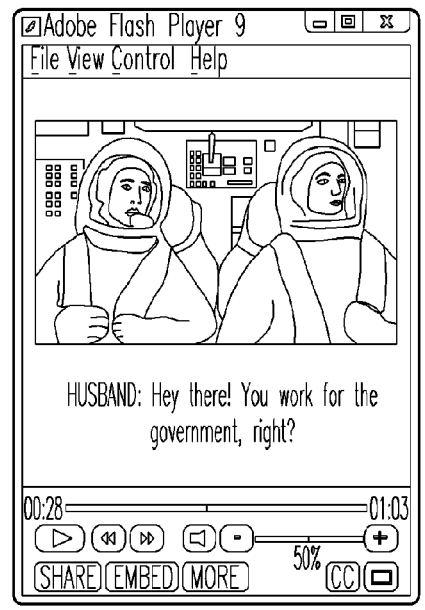
FIG. 16 is a screenshot showing one embodiment of the invention utilizing Adobe Flash™ Player 9.
Figure 17:
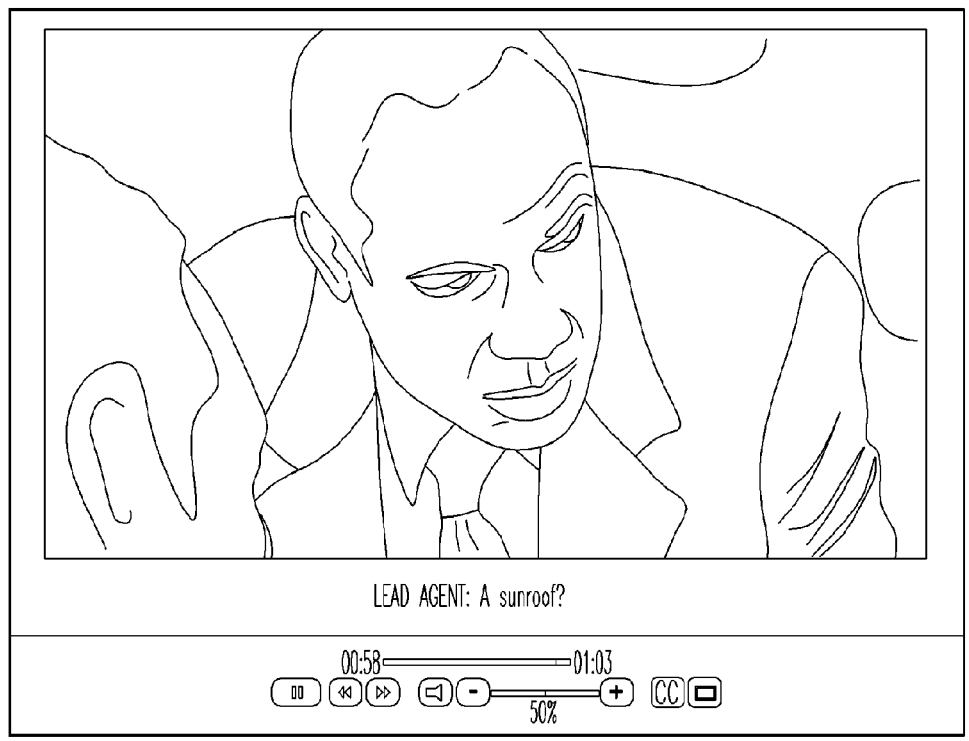
FIG. 17 is another view of the player.
Figure 18:
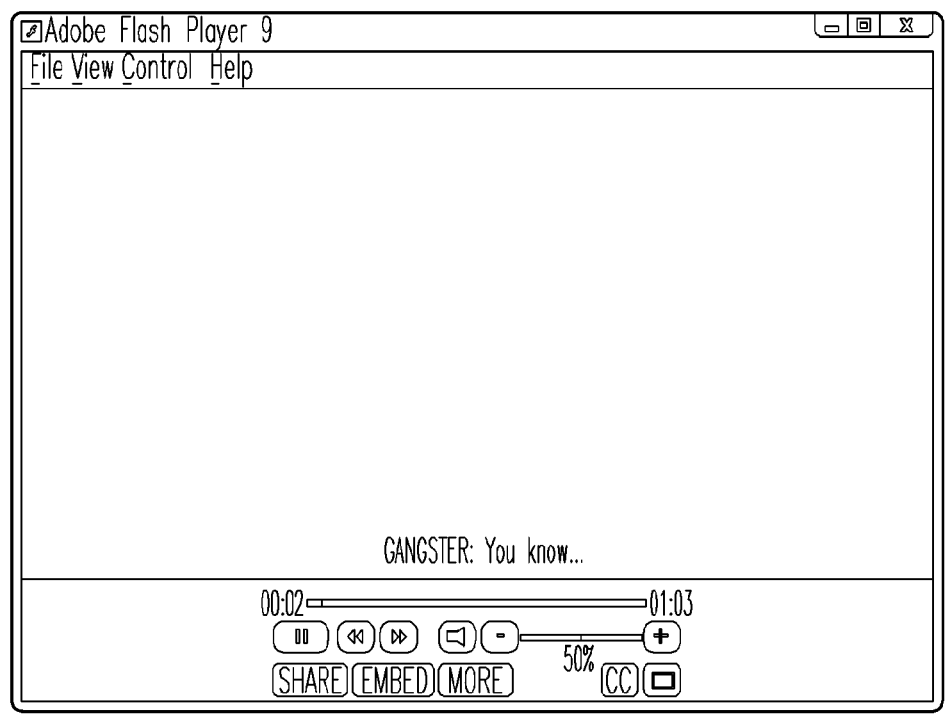
FIG. 18 is yet another view of the player.
Figure 19:
FIGS. 19-23 are additional views of embodiments of the player.
Figure 20:
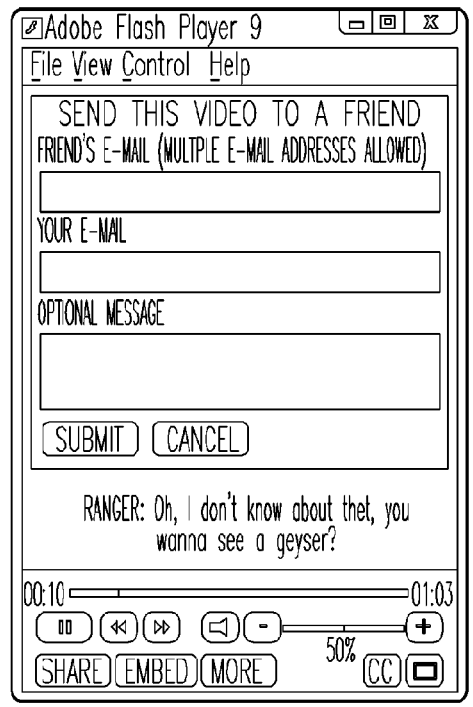
Figure 21:
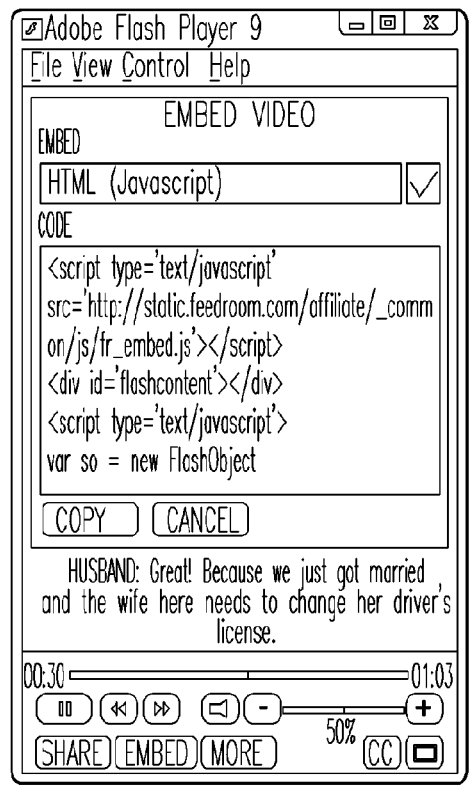
Figure 22:
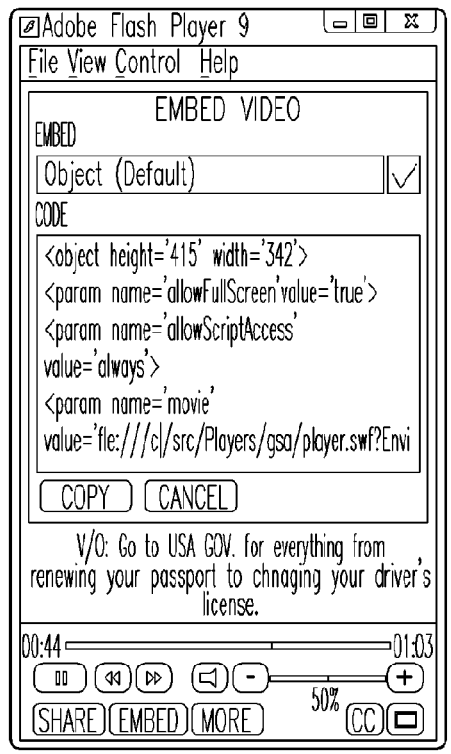
Figure 23:

When invoked, the Compiler application (See FIG. 12) imports and/or accesses source code from a designated player file as well as static and active player asset scripts corresponding to various attribute and component block assets associated with the player file. In at least one embodiment of the present invention some of these assets are stored in a temporary storage area of the File System. The player file compiles the player file and assets, creating an executable media player application. In an alternate embodiment, the Compiler is utilized to create an embedded web based media player application. In this embodiment, the Compiler (e.g., a JAVA™ based compiler) (See FIG. 13) imports and/or accesses a player file (e.g. an XML player file) and generates a custom script wrapper and a web based platform compatible player file, used by a cross platform compiler (e.g., an Adobe Flash™ based compiler) to call player assets and script components and then compile the combined information into a web based embedded player application (See FIG. 15).

Figure 14:
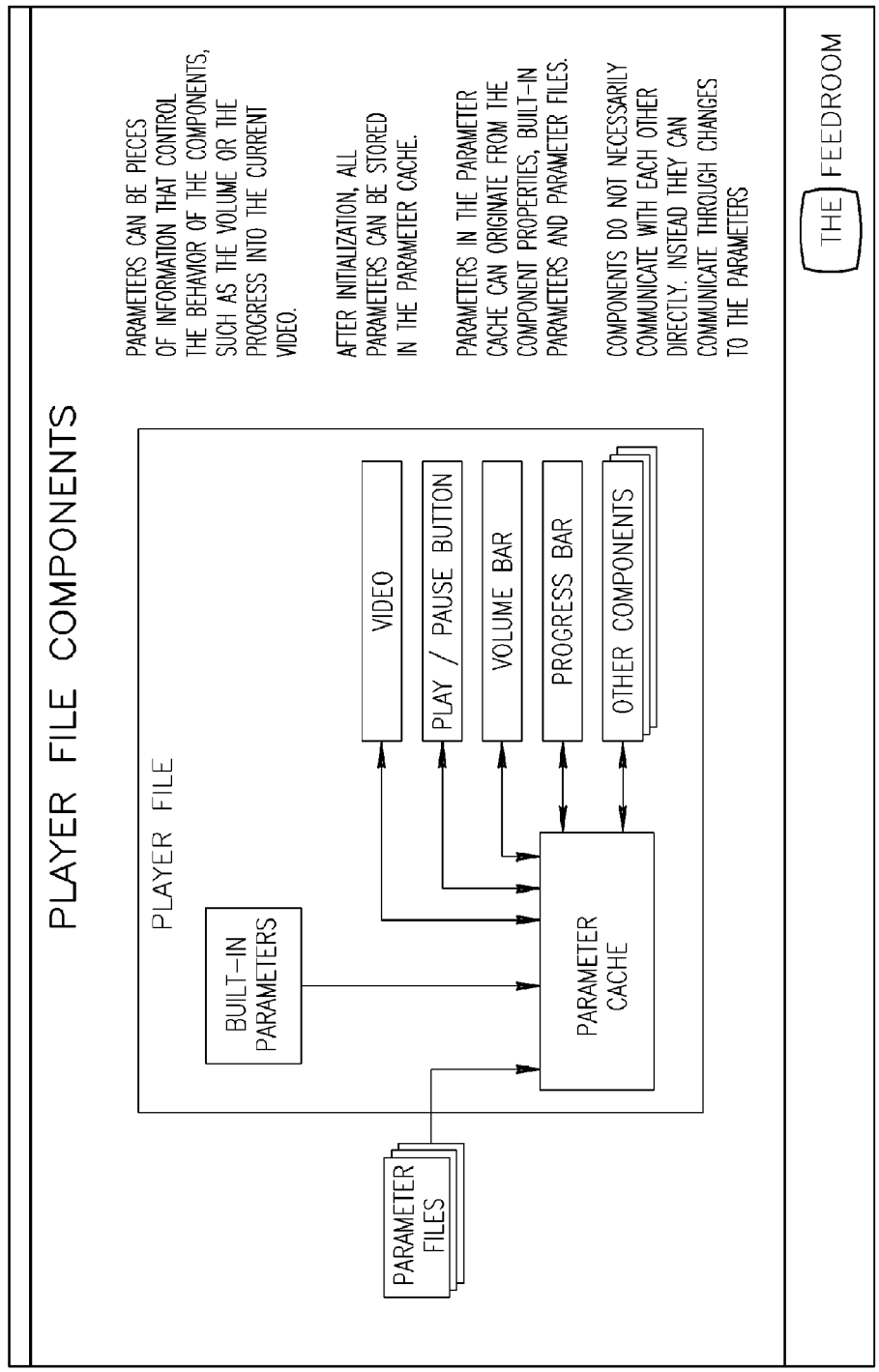
FIG. 14 is a diagram showing the Player File Components.

In accordance with an embodiment of the present invention, an example media player file includes both built in and externally input parameter asset files, a parameter cache, and various component assets (See FIG. 14). After initialization of the media player all parameters are stored in a parameter cache area of the player. Component assets communicate with each other indirectly (e.g., as class objects) when parameter changes are detected in the player.

In 1998, Congress amended the Rehabilitation Act to require Federal agencies to make their electronic and information technology accessible to people with disabilities. Inaccessible technology interferes with an individual's ability to obtain and use information quickly and easily. Section 508 was enacted to eliminate barriers in information technology, to make available new opportunities for people with disabilities, and to encourage development of technologies that will help achieve these goals. The law applies to all Federal agencies when they develop, procure, maintain, or use electronic and information technology. Under Section 508 (29 U.S.C. §794d), agencies must give disabled employees and members of the public access to information that is comparable to the access available to others.

Therefore, methods and systems for a disabled user compliant video player for an end-to-end streaming web video solution affording accessibility for disabled users, including blind users and those with partial or poor vision, colorblind users, deaf users and those limited to only keyboard/voice input is also disclosed herein. The Video Player advantageously addresses the individual needs of all of these users, and, in some embodiments, is compliant with Section 508 of the Rehabilitation Act, as amended in 1998, and in embodiments is compatible Level of "Triple-A*" for the W3C's Web Content Accessibility 1.0 Guidelines.

The video player is preferably the Access Player developed by FeedRoom but may be any video player used for video over a data communication link, an Internet or an Intranet. The video player preferably is configured to play a plurality of formats of web video and multimedia, and is configured to be used by with persons who have disabilities. The player is compliant with Flash as well as other video formats, and is capable of displaying closed captions.

The player is fully functional with multiple file formats and operating systems, but is preferably compatible with FLV and DFXP files. It provides a means for disabled end-users to access and consume the video content, with, or without, the use of Assisted Technologies (AT). The end-to-end solution encompasses placing an accessible link on the client's site (home page, and/or library page) to an accessible Representation of the stories in their Library (the 'Access Map'). The Access Map will preferably be dynamically generated from a special Data feed of the client's Library contents (the 508 Data feed), and will include links to an accessible RSS feeds page, an accessible Help page, as well as to a Access Player, capable of displaying synchronous captions for any video for which such associated metadata is available.

The player further includes player metric ping functionality; RSS pages; smart resizing of full-screen components, and/or tool tips for player controls. The player further includes the ability to pass in a parameter (into the Access Map) that would hide the left column of channel navigation, essentially turning a multi-channel Access Library into a single-channel Access Showcase.

The video player preferably contains, but is not limited to, three main components: an Access Bar, an Access Map and an Access Player. An Access Bar is generally a persistent link that is placed at the top of a client's Library page (it can also be placed elsewhere on the client's web site), and links to the client's Access Map. An Access Map is preferably an Representation of the client's library that is advantageously presented in a fully compliant manner, and provides navigation between channels of client-specific content, and for each video, provides a summary, thumbnail (which can include alt-text), and links to transcript files and the Access Player. A fully-accessible Help menu and RSS-links are available from the Access Map as well. An Access Player is the video player itself and can allow for the presentation of video with synchronous controls, can offer full-screen viewing mode, can offer the ability to e-mail links to specific videos and can reveal embed codes for including the Access Player on blogs or other web sites. All of this is advantageously accomplished while maintaining the highest level of accessibility to the broadest range of users.

In one embodiment, the digital player includes a feature that ensures non-text elements have a text equivalent, so that, for example, a blind user could use screen-reading technology to inform him of what is on the screen. This would include alt-text for every image, for example, the Access Map may have a StoryTile image for every story and a ClientLogo image in the header, at a minimum). The text used as alt-text for these images would differ from the text used for, e.g., the headline of Subheadline (this story on American Reading Habits might have a Headline "Read Any Good Books Lately?" with a picture of a man on a park bench reading a book, and the alt-text would be "man reading book on park bench"). Additionally, preferably every window could have a <title> tag that is descriptive. Additionally, every story may have a link to a formatted transcript. The player may also include a Flash Player that is preferably capable of displaying synchronous captions.

In one embodiment, the system and method will include versioning. The product version can be adapted on a per user basis, allowing for multiple versions to be working at the same time and further includes a version override mechanism which allows for the use of particular versions. Further still, the products persist over time while the versions may change. The product versioning may include but is not limited to: product version will be implicit and controlled on per site basis; the version can be set explicitly by passing variables; the version number may be multiple digits but in a preferred embodiment is three digits (first designating major functional product revision, second for minor functional revision and/or third for bug fixes and minor cosmetic changes); the implicit version does not have to be the latest version, but is user and/or developer specific; changing implicit version may have a mini-release of the skin/property file, with the new version that is quality assured; version number will preferably not be visible in the URI; but preferably will be watermarked as an html comment inside the pages for verification, audit and other purposes; all parts of the access product (map, FAQ, player, XML landing page etc) will preferably have to be on same version; moving one will require moving all to the same version; the actual directory structure will advantageously be hidden using internal rewrite rules for link persistence and future compatibility; an/or prior versions may be eliminated.

One embodiment of the player may be configured to be capable of satisfying one or more of the following illustrative requirements:

(a) When software is designed to run on a system that has a keyboard, product functions shall be executable from a keyboard where the function itself or the result of performing a function can be discerned textually.

(b) Applications shall not disrupt or disable activated features of other products that are identified as accessibility features, where those features arc developed and documented according to industry standards. Applications also shall not disrupt or disable activated features of any operating system that are identified as accessibility features where the application programming interface for those accessibility features has been documented by the manufacturer of the operating system and is available to the product developer.

(c) A well-defined on-screen indication of the current focus shall be provided that moves among interactive interface elements as the input focus changes. The focus shall be programmatically exposed so that Assistive Technology can track focus and focus changes.

(d) Sufficient information about a user interface element including the identity, operation and state of the element shall be available to Assistive Technology. When an image represents a program element, the information conveyed by the image must also be available in text.

(e) When bitmap images are used to identify controls, status indicators, or other programmatic elements, the meaning assigned to those images shall be consistent throughout an application's performance.

(f) Textual information shall be provided through operating system functions for displaying text. The minimum information that shall be made available is text content, text input caret location, and text attributes.

(g) Applications shall not override user selected contrast and color selections and other individual display attributes.

(h) When animation is displayed, the information shall be displayable in at least one non-animated presentation mode at the option of the user.

(i) Color coding shall not be used as the only means of conveying information, indicating an action, prompting a response, or distinguishing a visual element.

(j) When a product permits a user to adjust color and contrast settings, a variety of color selections capable of producing a range of contrast levels shall be provided.

(k) Software shall not use flashing or blinking text, objects, or other elements having a flash or blink frequency greater than 2 Hz and lower than 55 Hz.

(l) When electronic forms arc used, the form shall allow people using Assistive Technology to access the information, field elements, and functionality required for completion and submission of the form, including all directions and cues.

(a) A text equivalent for every non-text element shall be provided (e.g., via "alt", "longdesc", or in element content).

(b) Equivalent alternatives for any multimedia presentation shall be synchronized with the presentation.

(c) Web pages shall be designed so that all information conveyed with color is also available without color, for example from context or markup.

(d) Documents shall be organized so they are readable without requiring an associated style sheet.

(i) Frames shall be titled with text that facilitates frame identification and navigation (j) Pages shall be designed to avoid causing the screen to flicker with a frequency greater than 2 Hz and lower than 55 Hz.

(k) A text-only page, with equivalent information or functionality, shall be provided to make a web site comply with the provisions of this part, when compliance cannot be accomplished in any other way. The content of the text-only page shall be updated whenever the primary page changes.

(l) When pages utilize scripting languages to display content, or to create interface elements, the information provided by the script shall be identified with functional text that can be read by Assistive Technology.

(m) When a web page requires that an applet, plug-in or other application be present on the client system to interpret page content, the page must provide a link to a plug-in or applet that complies with §1194.21(a) through (l).

(n) When electronic forms arc designed to be completed on-line, the form shall allow people using Assistive Technology to access the information, field elements, and functionality required for completion and submission of the form, including all directions and cues.

(o) A method shall be provided that permits users to skip repetitive navigation links.

(c) All training and informational video and multimedia productions which support the agency's mission, regardless of format, that contain speech or other audio information necessary for the comprehension of the content, shall be open or closed captioned.

(d) All training and informational video and multimedia productions which support the agency's mission, regardless of format, that contain visual information necessary for the comprehension of the content, shall be audio described.

(e) Display or presentation of alternate text presentation or audio descriptions shall be user-selectable unless permanent.

(a) At least one mode of operation and information retrieval that does not require user vision shall be provided, or support for Assistive Technology used by people who are blind or visually impaired shall be provided.

(b) At least one mode of operation and information retrieval that does not require visual acuity greater than 20/70 shall be provided in audio and enlarged print output working together or independently, or support for Assistive Technology used by people who are visually impaired shall be provided.

(c) At least one mode of operation and information retrieval that does not require user hearing shall be provided, or support for Assistive Technology used by people who are deaf or hard of hearing shall be provided (d) Where audio information is important for the use of a product, at least one mode of operation and information retrieval shall be provided in an enhanced auditory fashion, or support for assistive hearing devices shall be provided.

(e) At least one mode of operation and information retrieval that does not require user speech shall be provided, or support for Assistive Technology used by people with disabilities shall be provided, (f) At least one mode of operation and information retrieval that does not require fine motor control or simultaneous actions and that is operable with limited reach and strength shall be provided.

The FeedRoom Access Help page contains information on enabling full keyboard access in the MacOs.

Using FeedRoom Access in conjunction with some screen reading software preferably uses JavaScript to be enabled on the web browser to attain full keyboard functionality. Instructions for doing so are provided.

FeedRoom Access meets these criteria. It is compatible with the following operating system and web browser combinations:

Windows Vista
Internet Explorer 7
Firefox 2
Windows XP
Internet Explorer 6
Internet Explorer 7
Firefox 2
Opera 9
Netscape 9
Windows 2000
Internet Explorer 6
Firefox 2
Opera 9
Mac Panther (OSX 10.3)
Safari 1
Firefox 2
Opera 8
Mac Tiger (OSX 10.4)
Safari 2
Firefox 2
Opera 8

FeedRoom Access supports keyboard tabbing. FeedRoom Access also supports the well-defined on-screen outline that represents current focus in the Access Player.

FeedRoom Access supports this criterion. All non-text elements have associated textual information.

FeedRoom Access meets these criteria.

FeedRoom Access has support for this criterion. There is support for this in text fields (for example, in certain standard dialog boxes).

FeedRoom Access meets these criteria. Applications recognize operating system settings for user-selected contrast, color and display attributes.

FeedRoom Access can be configured to include any animations to display information to the user.

FeedRoom Access supports this criterion. Although the video duration indicator and volume level indicator are presented using color as the primary means of conveying information, the video progress is also indicated by an on-screen time indicator, and the volume level is indicated by % of max volume, displayed below the volume indicator bar.

FeedRoom Access can be configured to permit color or contrast settings.

FeedRoom Access can be configured to include any flashing or blinking elements.

FeedRoom Access meets these criteria. Regarding electronic forms full keyboard accessibility is afforded for all supported OS/web browser combinations.

FeedRoom Access includes functionality that makes it possible to display videos and related content within FeedRoom Access that conform to this criterion. FeedRoom Access users are responsible for ensuring that their video content's associated images conforms to this criterion.

FeedRoom Access includes functionality that makes it possible to display videos within the FeedRoom Access Player that conform to this criterion. FeedRoom Access users are responsible for ensuring that their videos include associated caption files in DFXP format to ensure their videos conform to this criterion.

FeedRoom Access supports this criterion. The video duration indicator and volume level indicator are presented using color as the primary means of conveying information, but the video progress is also indicated by an on-screen time indicator, and the volume level is indicated by % of max volume, displayed below the volume indicator bar.

FeedRoom Access supports this criterion. by using external stylesheets called via <link> tags, and all pages are organized so as to be readable without the stylesheets.

FeedRoom Access supports criterion by employing unique IDs for each <div>.

FeedRoom Access supports this criterion. No elements of FeedRoom Access cause screen flicker outside of the designated range. User's of FeedRoom Access are responsible for the creation of the video content displayed by FeedRoom Access.

Some embodiments of FeedRoom Access enable compliant presentation of FeedRoom Library applications. FeedRoom Access can be automatically updated whenever the associated FeedRoom Library is updated.

FeedRoom Access supports this criterion in that any instance of client-side scripting has associated <nonscript> tags providing equivalent functionality.

FeedRoom Access supports this criterion. The only plug-in that may be used is Adobe Flash Player v9.0+. A link to obtain this plugin, or to update an older version, is provided in a manner compliant with §1194.21(a) through (l).

FeedRoom Access supports this criterion, providing both access and instructions for users requiring AT.

FeedRoom Access supports this criterion, providing skip instructions where relevant.

FeedRoom Access displays synchronous closed captions for all videos for which DFXP (Distribution Format Exchange Profile) caption files are available. FeedRoom can convert many formats of time-stamped transcripts into DFXP files, and can provide, as a premium service the creation of time-stamped transcript, or raw transcription services to assist clients with compliance.

FeedRoom Access allows for links for compliant transcript files for every video. FeedRoom can assist in the creation and/or hosting of such files, if needed, to assist clients with compliance.

The display of closed captions, for videos having associated DFXP files, is selectable by the user in FeedRoom Access.

FeedRoom Access supports the criterion, with few exceptions, allowing the use of screen readers to access user interface information. Commonly-used Assistive Technology (AT) may be used with FeedRoom Access. Users of AT should contact their AT vendor to assess the compatibility of their product with various web browsers to learn how to adjust their settings to optimize interoperability.

Known exceptions, including the use of JAWS screen reader with the FireFox web browser, are noted in the FeedRoom Access Help FAQ.

FeedRoom Access supports this criterion, affording system large font settings, high contrast settings, and other display settings used by visually impaired customers, including a full-screen viewing mode.

FeedRoom Access supports this criterion. FeedRoom Access provides the means for including formatted transcripts for videos, as well as the display of synchronous, on-screen captions, in a manner that does not interfere with the presentation of video. In all instances where FeedRoom Access provides an audio cue, a visual cue is provided as well.

FeedRoom Access supports this criterion. Audio information is not important for the use of FeedRoom Access, and text-based alternatives (transcripts and synchronous captions) are provided for as described in §1194.31(c) herein.

FeedRoom Access supports this criterion. FeedRoom Access does not need speech interaction for any functionality, but is compatible with commonly-used AT for navigation, control and inputting text into forms.

FeedRoom Access supports this criterion with few exceptions. All functionality is possible using only a keyboard, or alternate AT input devices. One known exception is a security limitation imposed by Adobe's Flash plug-in to allow keyboard input when full-screen mode is invoked.

The preceding illustrative features may satisfy some accessibility requirements. Other possible embodiments may incorporate one or more of these features to satisfy alternate existing or future accessibility requirements.

While the preferred embodiment of the invention has been illustrated and described, as noted above, many changes can be made without departing from the spirit and scope of the invention. Accordingly, the scope of the invention is not limited by the disclosure of the preferred embodiment. A description of example embodiments of the invention follows.

What is claimed is:

1. A data processing system configured to dynamically modify a custom media player, the system comprising:
    one or more computer processors configured to perform dynamic modification of a custom designed media player using a player designer system including:
    an asset manager configured to allow a user to associate player parameter assets with player block components defined in the custom designed player, such that the player parameter assets are configured to control behavior of the player block components;
    a player parameter cache storing the player parameter assets, the player parameter cache configured to facilitate dynamic modification of the custom designed media player by the user; and
    a compiler, in communication with the asset manager, configured to modify the custom designed media player such that the player block components are configured to communicate indirectly with each other in response to detecting changes to the player parameter assets;
    the player designer system enabling dynamic configuration of the custom designed media player as disabled user compliant, such that the custom designed media player is specifically configured to enable disabled end-users to access and consume video content without use of Assisted Technologies (AT); and
    the player designer system is configured to provide an end-to-end solution for a disabled user by configuring an accessibility link on a home page associated with the disabled user, the accessibility link linking to an online representation of video content in the disabled user's video library, providing an Access Map;
    wherein the Access Map is dynamically generated from a data feed of the client system's video library contents associated with the custom designed video player; and the Access Map further being dynamically generated with links to a disabled user compliant RSS feeds page, a disabled user compliant accessibility help page, and the disabled user compliant custom designed media player.

2. The data processing system as in claim 1 wherein the player block components are configured to communicate indirectly with each other as class objects in response to detecting changes to the player parameter assets, said indirect communication configuration being arranged to facilitate dynamic modification of the custom designed media player.

3. The data processing system as in claim 1 wherein player parameter assets are stored in the parameter cache in response to initialization of the custom designed media player.

4. The data processing system as in claim 1 wherein the player block component are configured as script assets including interactive command buttons, slide bars, dials, and checkboxes.

5. The data processing system as in claim 1 wherein the player parameter assets further include color configurations, aspect ratios configurations, media window block configurations, video configurations, and sound configurations.

6. A data processing system as in claim 5 wherein the window block configurations are respective parameters associated with a player window block and player controls block, which include: component sizing parameters, background colors parameters, component fill color parameters, and component opacity parameters.

7. The data processing system as in claim 1 wherein the asset manager creates a player parameter cache of player parameter assets associated with a player file to facilitate dynamic modification of the custom designed media player.

8. The data processing system as in claim 1 wherein the custom designed media player is configured by the player designer to play back select video files and audio files on both a stand-along computing device and computing devices connected to the Internet.

9. The data processing system as in claim 8 wherein the player designer system is configured to select one or more desired video files and audio files, which are capable of being processed and played back by the custom designed media player, such that other non-selected video files and audio files of a similar file type are restricted from being played back by the custom designed media player without further modification and configuration of the custom designed media player by the player designer system.

10. The data processing system as in claim 1 wherein the custom designed media player has previously been created and initialized, such that the player designer is configured to perform subsequent dynamic modification of the custom designed media player.

11. The data processing system as in claim 1 wherein the custom designed media player is configured with one or more engines operating using both host processing and client side processing, such that at least a portion of the custom designed media player is operating using host processing in a cloud configuration.

12. The data processing system as in claim 1 wherein a user logs into the player designer system using a user name and password associated with an approved customer account to enable dynamic modification of the custom designed media player.

13. The data processing system as in claim 12 wherein in response to user authentication, the player designer system enables the user to select a players feature providing a listing of existing custom media players associated with player templates in a cloud provided by host processing; and where each player listed can be redesigned, removed, previewed and exported as a custom designed media player.

14. The data processing system as in claim 13 wherein the template player listing provides a user with the ability to select a create a custom designed template media player with preconfigured assets and or attributes that meet a user's design preferences.

15. The data processing system as in claim 14 wherein the selection of a template player invokes the designer system, such that a preconfigured template player can be dynamically modified with various design tools in a dynamic configuration design mode.

16. The data processing system as in claim 1 wherein a new media player is created from scratch by invoking the designer application synchronously with a player build application.

17. The data processing system as in claim 16 wherein certain selected player block components are associated with the new player using the asset manager;

the asset manager configured to link a player identification to the certain selected block component for later retrieval by the complier.

18. The data processing system as in claim 1 wherein the asset manager is further configured to link a player identification file to the player block components for retrieval by the complier to facilitate dynamic modification of the custom designed media player.

19. The data processing system as in claim 1 wherein the player parameter assets are configured as static assets and the player block components are configured as interactive active player assets.

20. The data processing system as in claim 1 wherein the custom designed media player is a markup language file compiled by the complier into an an executable media player application.

21. The data processing system as in claim 1 wherein the custom designed media player is an embedded media player.

22. The data processing system as in claim 1 wherein the custom designed media player includes multiple instances such that the player designer system enables multiple versions of the custom designed media player, each respective version being identified using a version number.

23. The data processing system as in claim 22 wherein the respective version number is not displayed in the URI, but rather watermarked as an markup language comment inside the custom designed media player.

24. The data processing system as in claim 1 wherein the disabled user compliant custom designed media player is compatible with FLV and DFXP video content.

25. The data processing system as in claim 1 wherein the disabled user compliant custom designed media player is automatically configured with the Access Map, which includes alt-text for each respective image in the client system's video library contents.

26. The data processing system as in claim 1 wherein the disabled user compliant custom designed media player is configured to ensure that each non-text elements has a text equivalent to enable screen-reading technology for blind users to determine what is on the screen.

27. The data processing system as in claim 1 wherein the disabled user compliant custom designed media player is configured to ensure that any blinking text, objects, or other elements having a include any flashing or blinking elements in content, being played back by the disabled user compliant custom designed media player, have a flash or blink frequency greater than 2 Hz and lower than 55 Hz.

28. The data processing system as in claim 1 wherein the disabled user compliant custom designed media player is configured with Assistive Technology, such that electronic browser based input forms being processed by the disabled user compliant custom designed media player are configured with full keyboard access to enable disabled user compliant data input.

29. The data processing system as in claim 1 wherein the disabled user compliant custom designed media player is configured to preempt an attempt from another system to override any disabled access configurations provided by the disabled user compliant custom designed media player.

30. A computer program product stored on a non-transitory executable medium, the computer program product having computer readable instruction configured to dynamically modify a custom media player by:

enabling a user to associate player parameter assets with player block components defined in the custom designed player, such that the player parameter assets are configured to control behavior of the player block components;

creating a player parameter cache storing the player parameter assets, the player parameter cache configured to facilitate dynamic modification of the custom designed media player by the user;

modifying the custom designed media player such that the player block components are configured to communicate indirectly with each other in response to detecting changes to the player parameter assets;

configuring the modified custom designed media player as disabled user compliant such that the disabled user compliant custom designed media player prevents another system from overriding any disabled access configurations provided by the disabled user compliant custom designed media player;

enabling dynamic configuration of the custom designed media player as disabled user compliant, such that the custom designed media player is specifically configured to enable disabled end-users to access and consume video content without use of Assisted Technologies (AT); and providing an end-to-end solution for a disabled user by configuring an accessibility link on a home page associated with the disabled user, the accessibility link linking to an online representation of video content in the disabled user's video library, providing an Access Map;

wherein the Access Map is dynamically generated from a data feed of the client system's video library contents associated with the custom designed video player; and the Access Map further being dynamically generated with links to a disabled user compliant RSS feeds page, a disabled user compliant accessibility help page, and the disabled user compliant custom designed media player.

31. A method of dynamically modifying a custom media player, the method comprising:

associating player parameter assets with player block components defined in the custom designed player, such that the player parameter assets are configured to control behavior of the player block components;

storing the player parameter assets in a temporary storage location configured to facilitate dynamic modification of the custom designed media player by the user;

modifying the custom designed media player such that the player block components are configured to communicate indirectly with each other in response to detecting changes to the player parameter assets;

configuring the modified custom designed media player as disabled user compliant such that the disabled user compliant custom designed media player prevents another system from overriding any disabled access configurations provided by the disabled user compliant custom designed media player;

enabling dynamic configuration of the custom designed media player as disabled user compliant, such that the custom designed media player is specifically configured to enable disabled end-users to access and consume video content without use of Assisted Technologies (AT); and providing an end-to-end solution for a disabled user by configuring an accessibility link on a home page associated with the disabled user, the accessibility link linking to an online representation of video content in the disabled user's video library, providing an Access Map;

wherein the Access Map is dynamically generated from a data feed of the client system's video library contents associated with the custom designed video player; and the Access Map further being dynamically generated with links to a disabled user compliant RSS feeds page, a disabled user compliant accessibility help page, and the disabled user compliant custom designed media player.

* * * * *